United States Patent [19]

Uchida et al.

[11] Patent Number: 5,474,857
[45] Date of Patent: Dec. 12, 1995

[54] SOLID POLYMER TYPE FUEL CELL AND METHOD FOR MANUFACTURING THE SAME

[75] Inventors: Makoto Uchida; Yuko Aoyama; Nobuo Eda, all of Hirakata; Masahiko Ogawa, Moriguchi, all of Japan

[73] Assignee: Matsushita Electric Industrial Co., Ltd., Osaka, Japan

[21] Appl. No.: 265,730

[22] Filed: Jun. 27, 1994

[30] Foreign Application Priority Data

| Aug. 6, 1993 | [JP] | Japan | 5-195730 |
| Nov. 11, 1993 | [JP] | Japan | 5-282278 |
| Mar. 31, 1994 | [JP] | Japan | 6-062635 |

[51] Int. Cl.$^6$ ............................................. H01M 8/10
[52] U.S. Cl. ............................. 429/33; 429/30; 429/34; 429/42; 29/623.5
[58] Field of Search ................................ 429/30, 33, 42, 429/34; 29/623.5

[56] References Cited

U.S. PATENT DOCUMENTS

| 5,211,984 | 5/1993 | Wilson . | |
| 5,272,017 | 12/1993 | Swathirajan et al. | 429/33 |
| 5,330,860 | 7/1994 | Grot et al. | 429/42 |

FOREIGN PATENT DOCUMENTS

| 0228602 | 7/1987 | European Pat. Off. . |
| 0305565 | 3/1989 | European Pat. Off. . |
| 0483085 | 4/1992 | European Pat. Off. . |
| 0577291 | 1/1994 | European Pat. Off. . |
| 621119 | 12/1986 | Japan . |
| 62118B2 | 12/1986 | Japan . |
| 248632 | 3/1989 | Japan . |
| 3184266 | 8/1991 | Japan . |
| 3-295172 | 12/1991 | Japan . |
| 3295172 | 12/1991 | Japan . |
| 4264367 | 9/1992 | Japan . |
| 536418 | 2/1993 | Japan . |
| 9215121 | 9/1992 | WIPO . |

OTHER PUBLICATIONS

Patent Abstracts of Japan, vol. 16, No. 134 (E–1185) 6 Apr. 1992 JP–A–03 295 172 (*MITSUBISHI HEAVY IND LTD0* 26 Dec. 1991.

Patent Abstracts of Japan, vol. 15, no. 438 (E–1130) 8 Nov. 1991 & JP–A–03 184 266 (TOSHIBA CORP. 12 Aug. 1991.

Patent Abstracts of Japan, vol. 17, No. 319 (E–1383) 17 Jun. 1993 & JP–A–05 036 418 (FUJI ELECTRIC CO LTD. 12 Feb. 1993.

Wilson, et al, "Thin–Film Catalyst Layers for Polymer Electrolyte Fuel Cell Electrodes", Journal of Applied Electrochemistry, vol. 22, No. 1, Jan. 1992, pp. 1–7.

Uchida, et al., Journal of the Electrochemical Society, vol. 142, No. 2, Feb. 1995, pp. 463–468.

Masahiro Watanabe et al, "New Preparation Method of a High Performance Gas Diffusion Electrode Working at 100 % Utilization of Catalyst Clusters and Analysis of the Reaction Layer"; J. Electroanal. Chem., 197 (1986) pp. 195–208.

*Primary Examiner*—Prince Willis, Jr.
*Assistant Examiner*—M. Nuzzolillo
*Attorney, Agent, or Firm*—Stevens, Davis, Miller & Mosher

[57] ABSTRACT

The invention provides a solid polymer electrolyte having high performances in which the reaction area of electrode is increased by uniformly dispersing and bonding a solid polymer electrolyte and a catalyst and the ability of gas feeding to the reaction site is improved by adding a fluoropolymer so that the catalyst is not excessively coated. A method for making the fuel cell is also provided. The electrode provided on at least one side of a solid polymer electrolyte membrane is formed by coating on one side of a gas-diffusible layer a mixed dispersion of a noble metal catalyst, a carbon fine powder and a colloidal dispersion of a solid polymer electrolyte, the colloidal dispersion being prepared using an organic solvent having a polar group other than hydroxyl group in the molecule and having a carbon chain of 1–8 carbon atoms which bonds to the polar group or having a dielectric constant of 3–10.

21 Claims, 5 Drawing Sheets

SOLID POLYMER TYPE FUEL CELL AND METHOD FOR MANUFACTURING THE SAME

BACKGROUND OF THE INVENTION

1. Field of the Invention

The present invention relates to a fuel cell which uses as a fuel a reducing agent such as pure hydrogen or modified hydrogen obtained from methanol or fossil fuels and as an oxidizing agent air or oxygen, and more particularly to an assembly of a solid polymer electrolyte membrane and electrodes, and a method for the manufacture of the assembly.

2. Description of Prior Art

One of the most important factors which govern the discharge performance of solid polymer type fuel cells is the reaction area at an interface of three phases formed by pores which are passages for feeding of reaction gas, a solid polymer electrolyte having protonic conductivity due to containing of water, and an electrode material of electronic conductor at the interface between a solid polymer electrolyte membrane and an electrode.

Hitherto, in order to increase the three phase interface, it has been attempted to apply a layer prepared by mixing and dispersing an electrode material and a solid polymer electrolyte to the interface between the membrane and a porous electrode. For example, Japanese Patent Kokoku (Examined Publn.) Nos. 62-61118 and 62-61119 disclose a method which comprises coating a mixture of a solution of solid polymer electrolyte with a catalyst compound on a solid polymer membrane, hot pressing the coated membrane on an electrode material and then reducing the catalyst compound or carrying out the coating after the reduction and then carrying out the hot pressing.

Japanese Patent Kokoku (Examined Publn.) No. 2-48632 employs a method which comprises molding a porous electrode, sprinkling a solution of an ion-exchange membrane resin on the electrode and hot pressing the electrode and the ion-exchange membrane. Furthermore, Japanese Patent Kokai (Unexamined Publn.) No. 3-184266 uses a powder prepared by coating a solid polymer electrolyte on the surface of a polymer resin, Japanese Patent Kokai (Unexamined Publn.) No. 3-295172 employs a method which comprises incorporating a powder of a solid polymer electrolyte into an electrode. Japanese Patent Kokai (Unexamined Publn.) No. 5-36418 discloses a method which comprises mixing a solid polymer electrolyte, a catalyst, a carbon powder and a fluoropolymer and forming the mixture into a film to form an electrode.

All of the above patent publications use solvents of alcohols for the solutions of the solid polymer electrolyte. Furthermore, U.S. Pat. No. 5,211,984 reports a method which comprises preparing an inky dispersion comprising a solid polymer electrolyte, a catalyst and a carbon powder using glycerin or tetrabutylammonium salt as a solvent, casting the dispersion on a polytetrafluoroethylene (hereinafter referred to as "PTFE"), and then transferring it onto the surface of a solid polymer electrolyte membrane or a method which comprises changing the exchanging group of a solid polymer electrolyte membrane to Na type, coating the above inky dispersion on the surface of the membrane and heating and drying the coat at 125° C. or higher to again change the group to H type.

In order to realize the high output density which is a feature of solid polymer type fuel cells, it is important to form feeding channels for reaction gas (gas channel) in the electrode catalyst layer to enhance the performance to feed the gas to the reaction site. Therefore, it has been attempted to add a water repellent material such as a fluoropolymer and to form a gas channel in the layer.

For example, in Japanese Patent Kokai (Unexamined Publn.) No. 5-36418, PTFE powders and carbon powders supporting a catalyst are dispersed in a solution of a solid polymer electrolyte and kneaded and a catalyst layer is formed therefrom. Furthermore, in Japanese Patent Kokai (Unexamined Publn.) No. 4-264367, an electrode is prepared using a mixed solution of carbon powders supporting a catalyst with a colloid solution of PTFE.

Furthermore, J. Electroanal. Chem. 197 (1986) describes on page 195 that carbon powders subjected to water repelling treatment with PTFE are mixed with carbon powders supporting a catalyst and a gas-diffusible electrode for acidic electrolyte is prepared therefrom. In U.S. Pat. No. 5,211,984, a catalyst layer of electrode is prepared using only a solid polymer electrolyte, a catalyst and a carbon powder without using the water repellent material mentioned above.

However, the conventional methods disclosed in the above patent publications suffer from the problem that no sufficient reaction area can be ensured at the interface between the electrode and the ion-exchange membrane because of insufficient degree of contact between the solid polymer electrolyte and the catalyst.

Furthermore, when the dispersion with alcoholic solvents is coated on a porous substrate or when the inky dispersion is coated on a porous substrate, the dispersion cannot be directly molded on the surface of the substrate as the dispersion penetrates or permeates into the inside of the substrate and thus, complicated processing techniques such as transferring are needed.

Moreover, the above-mentioned method of directly coating the inky dispersion on the surface of the membrane requires the complicated production technique of replacing the exchange group of the membrane many times.

The method of adding a fluoropolymer has the defect that the catalyst particles are coated excessively with the fluoropolymer and the reaction area diminishes to cause deterioration of polarization characteristics. On the other hand, if the carbon powder subjected to water repelling treatment with PTFE is used as described in J. Electroanal. Chem., coating of the catalyst particles with PTFE can be controlled, but no investigation has been made on the effects of addition of the water repelled carbon powder or amount of the carbon powder added in case the solid polymer electrolyte is used. Further, when the electrode is made of only the catalyst-supporting carbon powder and the solid polymer electrolyte, there are problems that the cell voltage at a high current density decreases or becomes unstable due to flooding of water produced.

SUMMARY OF THE INVENTION

The first object of the present invention is to provide a solid polymer type fuel cell in which the reaction area inside the electrode is increased by contacting the solid polymer electrolyte with a catalyst at a sufficient probability, thereby to give the higher performances and a method for the manufacture of the fuel cell, and a simple method for realizing the assembly of the solid polymer electrolyte membrane and the electrode.

The second object of the present invention is to provide a solid polymer type fuel cell in which gas channels are formed without excessive coating of the catalyst with addition of a fluoropolymer to enhance the ability of gas feeding to the reaction site and the higher performance is exhibited in the area of a high current density and a method for the manufacture of the fuel cell.

Other objects of the present invention will be apparent from the following description and examples.

BRIEF DESCRIPTION OF THE DRAWINGS

FIGS. 1A to 1D schematically show use of the solid polymer electrolyte of the present invention, and especially.

DETAILED DESCRIPTION OF PREFERRED EMBODIMENTS

The present invention relates to a solid polymer type fuel cell, characterized by comprising a solid polymer electrolyte membrane and an electrode provided on at least one side of the membrane, said electrode containing at least a noble metal catalyst, a carbon powder and a solid polymer electrolyte and being formed by preparing a colloidal dispersion of the solid polymer electrolyte, mixing the colloidal dispersion with the noble metal catalyst and the carbon powder, preferably fine powder and coating the mixture on a gas-diffusible layer, and to a method for the manufacture of such fuel cell.

Furthermore, for preparing the above-mentioned colloidal dispersion, a process is selected which comprises mixing an organic solvent having a polar group other than hydroxyl group in the molecule and having a carbon chain of 1–8 carbon atoms which bonds to the polar group with an alcoholic solution of the solid polymer electrolyte. As the organic solvent, there may be used, for example, one or more solvents having an ester group in the molecule and having a carbon chain of 1–7 carbon atoms. Moreover, one or more organic solvents having a dielectric constant of 3–10 may be used.

The present invention further provides a method for manufacturing a solid polymer type fuel cell in which the electrode is made by adding to a noble metal catalyst-supporting carbon powder a carbon powder subjected to water repelling treatment with 25–70% by weight of a fluoropolymer in an amount of 10–50% by weight of the carbon powder supporting the noble metal catalyst and mixing the mixture with a colloidal dispersion of a solid polymer electrolyte, coating the mixture on a gas-diffusible layer and integrally molding the coated gas-diffusible layer to an electrode.

Figure 2:
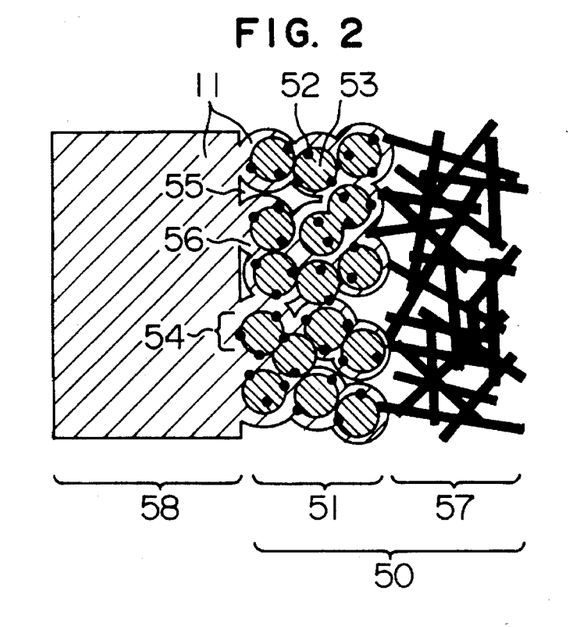
FIG. 2 is a schematic sectional view of the electrode in the example of the present invention.

According to the above method of manufacture, it becomes possible to disperse catalyst fine particles 52, carbon powders 53 and solid polymer electrolyte 11 in such a state that they uniformly adhere to each other inside the catalyst layer 51 of electrode 50 as shown in FIG. 2.

According to such construction of the catalyst layer 51, the three channels of gas channel 55 formed by the void between the carbon powders 53 which is a passage for feeding a fuel gas such as hydrogen or an oxidizing agent gas such as oxygen, proton channel 56 formed by the hydrated solid polymer electrolyte 11, and electron channel 54 formed by mutual connection of the carbon powders can be efficiently formed in close to each other inside the same catalyst layer. In FIG. 2, 58 indicates a solid polymer electrolyte membrane.

Accordingly, feed of hydrogen and oxygen gas and transfer of proton and electron can be carried out simultaneously and smoothly in a wide range by the following reaction at the hydrogen electrode:

$$H_2 \rightarrow 2H^+ + 2e^-$$

and the following reaction at the oxygen electrode:

$$\tfrac{1}{2}O_2 + 2H^+ + 2e^- \rightarrow H_2O.$$

Therefore, the reaction rate and the reaction area are increased and it becomes possible to realize a solid polymer type fuel cell which exhibits the higher discharge performance.

Figure 3:
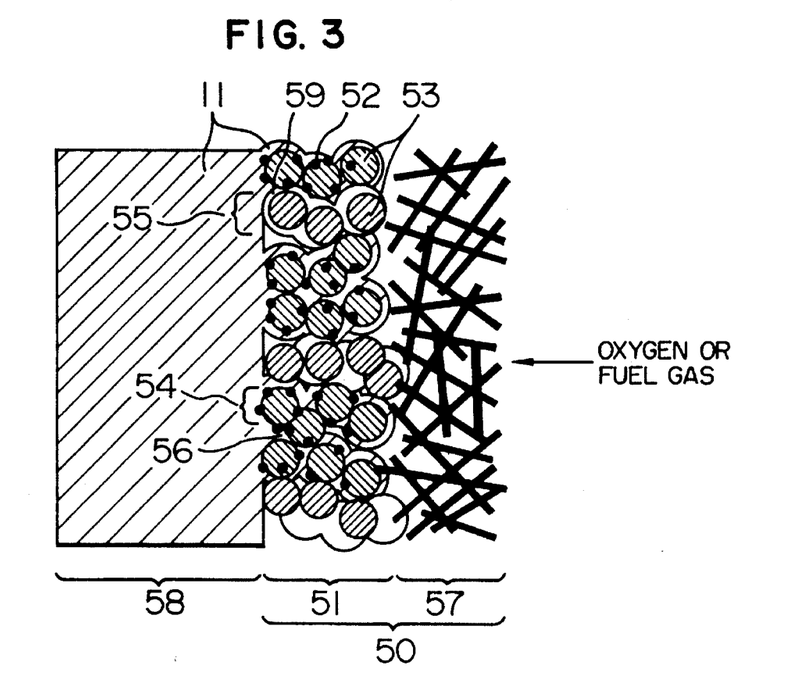
FIG. 3 is a schematic sectional view of the electrode in another example of the present invention.

Furthermore, as shown in FIG. 3, by further adding a carbon powder subjected to water repelling treatment with fluoropolymer 59 to the catalyst layer 51, the gas channel 55 can be formed without excessively coating the catalyst particles 52 and thus, it becomes possible to realize a solid polymer type fuel cell which shows the higher polarization characteristic in the area of high current density.

The present invention will be explained in more detail by the following examples.

EXAMPLE 1

The method for the manufacture of the present invention will be explained referring to FIG. 1 which shows the first step and the second step of the present invention and FIG. 6 which shows the pattern of all the steps.

Figure 1A:
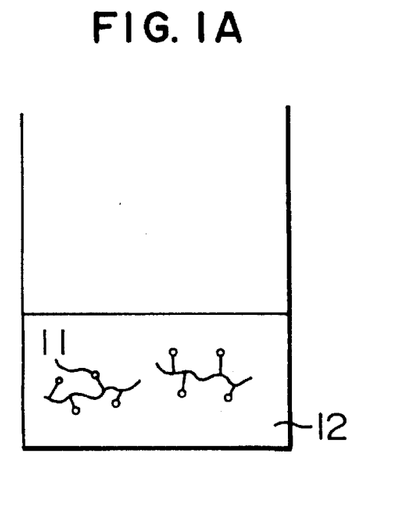
FIG. 1A shows the state of solution of the solid polymer electrolyte.
Figure 1B:
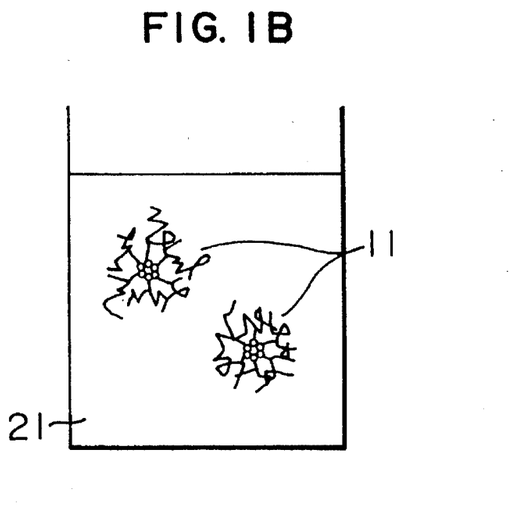
FIG. 1B shows the state of colloidal dispersion of the solid polymer electrolyte.

In the first step, the colloidal dispersion of the solid polymer electrolyte as shown in FIG. 1B is produced by mixing the alcoholic solution 12 containing the solid polymer electrolyte 11 as shown in FIG. 1A with organic solvent 21 with stirring.

Figure 1C:
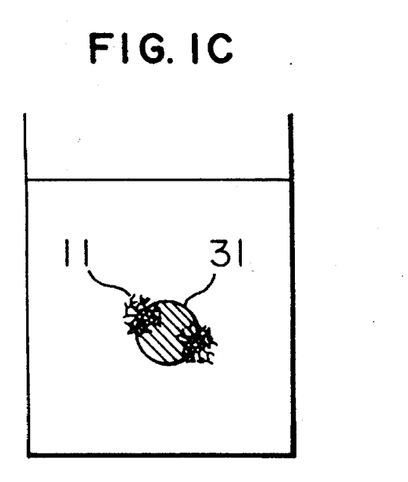
FIG. 1C shows the state of the solid polymer electrolyte being adsorbed onto a catalyst-supporting carbon powder.

In the second step, when carbon powders 31 supporting a catalyst (not shown) are added to the above colloidal dispersion, the solid polymer electrolyte 11 is adsorbed to the surface of the catalyst-supporting carbon fine powders 31 as shown in FIG. 1C. The size of agglomeration of the solid polymer electrolyte 11 changes depending on the amount of the organic solvent and the difference in the molecular chains of the organic solvent and uniformity of the adsorption can be controlled.

Figure 1D:
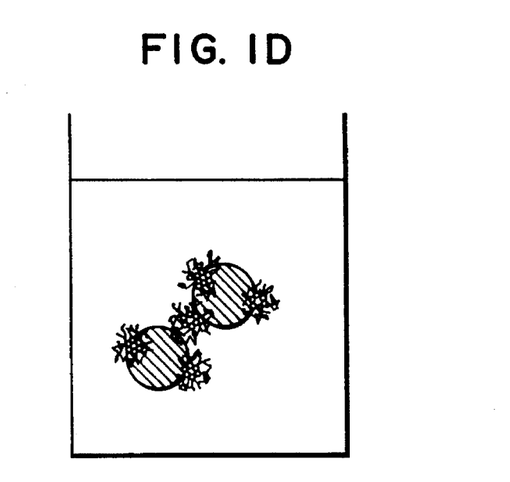
FIG. 1D shows the state of bridging agglomeration.

When the catalyst-supporting carbon powders 31 which adsorb the solid polymer electrolyte 11 are allowed to collide with each other by means of ultrasonic dispersion or the like, the adsorbed polymer is also adsorbed to the other carbon powders 53, resulting in bridging agglomeration as shown in FIG. 1D and the dispersion becomes colloidal, detailedly, pasty.

Figure 6:
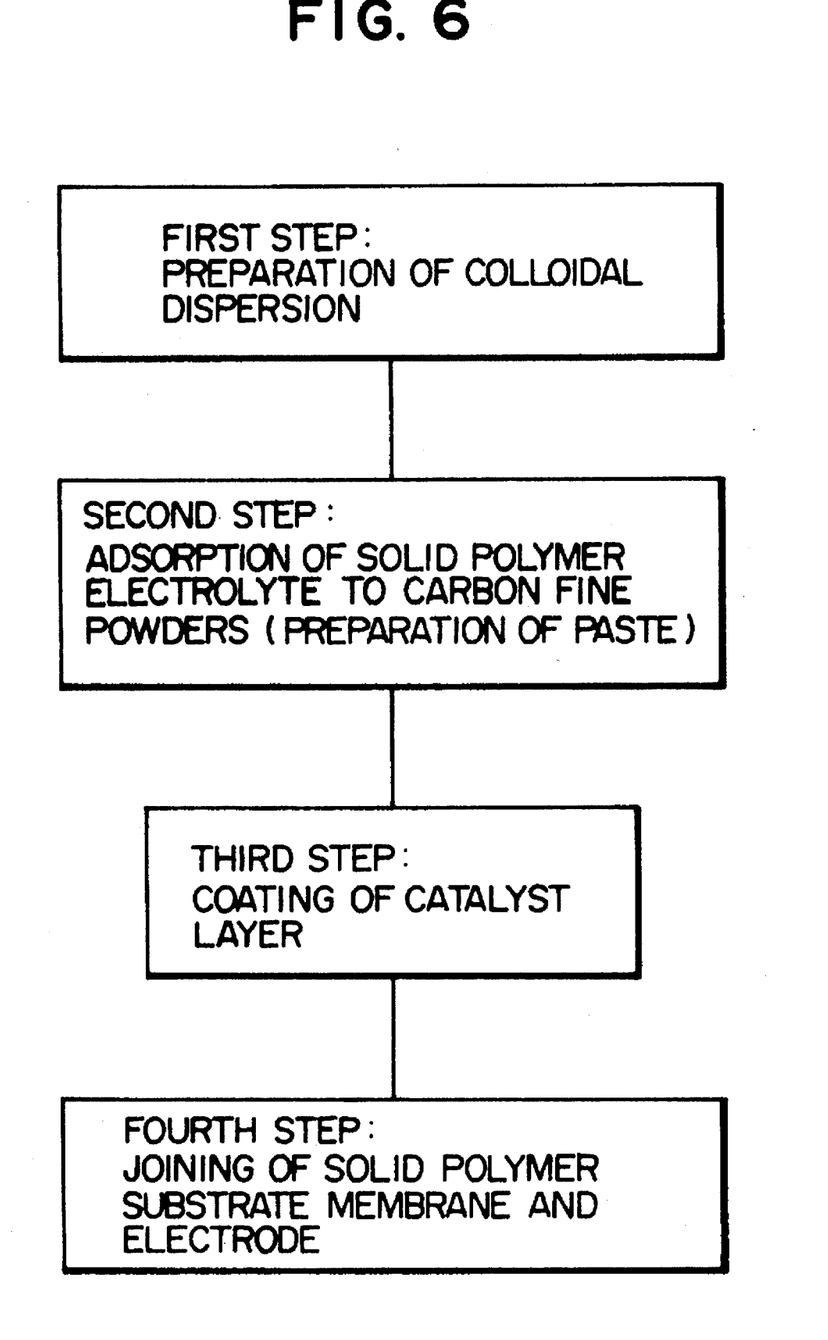
FIG. 6 is a block diagram which shows the steps of manufacture of the solid polymer type fuel cell in the example of the present invention.

In the third step shown in FIG. 6, the resulting paste is coated on the gas-diffusible layer 57 (usually comprising a carbon paper) and is molded. Penetration of the catalyst-supporting carbon powders 31 into the gas-diffusible layer 57 can be prevented by the bridging agglomeration in the second step and only the solvent is filtrated and removed and as a result, formation of the catalyst layer 51 on the gas-diffusible layer 57 becomes possible. In the fourth step, the electrode 50 is hot pressed onto the solid polymer electrolyte membrane 58 to make a cell. This is schematically shown in FIG. 2.

In the above first step, n-butyl acetate ($CH_3COOCH_2(CH_2)_2CH_3$) was used as the organic solvent of ester and "5% Nafion solution" manufactured by Aldrich Chemical Co., Inc. was used as the solid polymer electrolyte. A white colloidal dispersion was produced by mixing 60 g of n-butyl acetate with 1 g of the Nafion polymer.

In the second step, when 50 g of carbon powders which supported 10–25% by weight of a platinum catalyst were added to the above colloidal dispersion, the dispersed solid polymer electrolyte was adsorbed to the surface of the catalyst-supporting carbon powders and the supernatant liquid became transparent. When the carbon powders to which the solid polymer electrolyte was adsorbed were allowed to collide with each other by an ultrasonic dispersing machine, the adsorbed polymer was also adsorbed to other carbon powders to bring about bridging agglomeration and the dispersion became pasty.

In the third step, the resulting paste was coated on a carbon paper substrate to which 20–60% by weight of a fluoropolymer was added (manufactured by Toray Industries, Inc.). The bridging agglomeration which occurred in the second step prevented the catalyst fine particles from penetrating into the carbon paper and only the solvent was removed and filtrated, whereby it became possible to mold the catalyst layer on the surface of the substrate. In the fourth step, the above electrodes were hot pressed on both sides of Nafion membrane manufactured by DuPont de Nemours, E., I., Co. by application of a pressure of 5–100 kg/cm$^2$ at 120°–200° C. to make a cell A.

In this Example 1, n-butyl acetate was used as an ester organic solvent. The dispersing state of the colloidal dispersion changed depending on difference in the carbon chains of the solvent and when the dispersion of the solid polymer electrolyte was added to an ester solvent in which the carbon chain bonding to a polar group had 8 or more carbon atoms, such as 2-ethylhexyl acrylate, the solid polymer electrolyte produced a white precipitate. If the precipitate is formed, the uniformity of adsorption to the carbon powders in the second step decreases. Therefore, dispersion of the solid polymer electrolyte was poor and the polarization characteristics of the cell could hardly be taken out.

EXAMPLE 2

Cell B was produced in the same manner as in Example 1 except that tetrahydrofuran ($C_4H_8O$) was used as an ether organic solvent in the first step.

In this Example 2, tetrahydrofuran was used as the ether organic solvent. The dispersing state of the colloidal dispersion changed depending on difference in the carbon chains of the solvent and when the dispersion of the solid polymer electrolyte was added to an ether solvent in which the carbon chain bonding to a polar group had 2 or less carbon atoms, such as diethyl ether, the colloidal dispersion was not produced. Furthermore, when the dispersion of the solid polymer electrolyte was added to an ether solvent in which the carbon chain bonding to a polar group had 6 or more carbon atoms, such as dihexyl ether, the solid polymer electrolyte produced a white precipitate and the polarization characteristics of the cell could hardly be taken out.

EXAMPLE 3

Cell C was produced in the same manner as in Example 1 except that methyl amyl ketone ($CH_3CO(CH_2)_4CH_3$) was used as an organic solvent of a ketone in the first step.

In this Example 3, methyl amyl ketone was used as the ketone organic solvent. The dispersing state of the colloidal dispersion changed depending on difference in the carbon chains of the solvent and when the dispersion of the solid polymer electrolyte was added to a ketone solvent in which the carbon chain bonding to a polar group had 3 or less carbon atoms, such as methyl ethyl ketone or methyl propyl ketone, the colloidal dispersion was not produced.

Furthermore, when the dispersion of the solid polymer electrolyte was added to a ketone solvent in which the carbon chain bonding to a polar group had 9 or more carbon atoms, such as methyl-n-nonyl ketone, the solid polymer electrolyte produced a white precipitate and the polarization characteristics of the cell could hardly be taken out.

EXAMPLE 4

Cell D was produced in the same manner as in Example 1 except that n-butylamine ($CH_3(CH_2)_3NH_2$) was used as an organic solvent of amine in the first step.

In this Example 4, n-butylamine was used as the amine organic solvent. The dispersing state of the colloidal dispersion changed depending on difference in the carbon chains of the solvent and when the dispersion of the solid polymer electrolyte was added to an amine solvent in which the carbon chain bonding to a polar group had 6 or more carbon atoms, such as cyclohexylamine, the solid polymer electrolyte produced a white precipitate and the polarization characteristics of the cell could hardly be taken out.

EXAMPLE 5

Cell E was produced in the same manner as in Example 1 except that n-butyric acid ($CH_3(CH_2)_2COOH$) was used as an organic solvent of carboxylic acid in the first step.

In this Example 5, n-butyric acid was used as the carboxylic acid solvent. The dispersing state of the colloidal dispersion changed depending on difference in the carbon chains of the solvent and when the dispersion of the solid polymer electrolyte was added to a carboxylic acid solvent in which the carbon chain bonding to a polar group had 7 or more carbon atoms, such as octanoic acid, the solid polymer electrolyte produced a white precipitate and the polarization characteristics of the cell could hardly be taken out.

As other organic solvents, alcohols and glycols such as isopropyl alcohol, ethylene glycol and decyl alcohol were used, none of these solvents produced colloidal dispersions and the effects of the present invention could not be obtained.

Furthermore, when the dispersion of the solid polymer electrolyte was added to organic solvents having no polar group such as hexane, toluene, dodecane, cyclohexane, benzene, naphtha and kerosene, the solid polymer electrolyte produced a white precipitate and dispersion of the solid polymer electrolyte was poor and polarization characteristics of the cells could hardly be taken out.

EXAMPLE 6

Cell F together with cells A, B and C were produced in the same manner as in Example 1 except that n-butyl acetate ($CH_3COOCH_2(CH_2)_2CH_3$) as an organic solvent having a dielectric constant of 5.01 used in Example 1, tetrahydrofuran ($C_4H_8O$) as an organic solvent having a dielectric constant of 7.58 used in Example 2, methyl amyl ketone ($CH_3CO(CH_2)_4CH_3$) as an organic solvent having a dielectric constant of 9.77 used in Example 3, and furthermore, propionic acid ($C_2H_5COOH$) as an organic solvent having a dielectric constant of 3.44 were used in the first step.

In the above Example, organic solvents having a dielectric constant of about 3–10 were used. The dispersing state of the colloidal dispersion changed depending on difference in the carbon chains of the solvent and when the dispersion of the solid polymer electrolyte was added to organic solvents having a dielectric constant of more than 10 such as n-octanol, ethylene glycol and glycerin having dielectric constants of 10.34, 37.7 and 42.5, respectively, colloidal dispersions were not produced.

When the dispersion of the solid polymer electrolyte was added to organic solvents having a dielectric constant of less than 3 such as n-hexane, benzene, toluene, p-xylene and dodecane having dielectric constants of 1.89, 2.284, 2.379, 2.27 and 2.02, respectively, the solid polymer electrolyte produced a white precipitate and the polarization characteristics of the cells could hardly be taken out.

The dielectric constant changes depending on temperature. Therefore, the values of the dielectric constant used in the present invention are represented in principle by those which are measured at 20°–25° C. as described in general handbooks.

EXAMPLE 7

Cell A' was produced in the same manner as in Example 1 except that 25 g of carbon powders subjected to water repelling treatment with addition of 25–70% by weight of PTFE were further added in preparing the dispersion in the second step.

Comparative Example

For comparison, one example of production of solid polymer type fuel cells by conventional technique is shown below.

First, carbon powders on which 10–25% by weight of a platinum catalyst was supported were mixed with carbon powders subjected to water repelling treatment with addition of 25–70% by weight of PTFE.

The resulting mixed powders for catalyst layer were sprinkled on a carbon paper to which 20–60% by weight of a fluoropolymer was added and this carbon paper was hot pressed at 340°–380° C. under a pressure of 5–20 kg/cm² to make an electrode.

Addition of the solid polymer electrolyte to this electrode was carried out by coating a solution prepared by mixing 2 ml of isopropyl alcohol with 0.05–1.5 g of Nafion solution on the catalyst layer with being sucked from the carbon paper side by a pump and drying the coat. The thus produced electrodes were bonded to a solid polymer membrane in the same manner as in Example 1 to make cell X.

Figure 4:
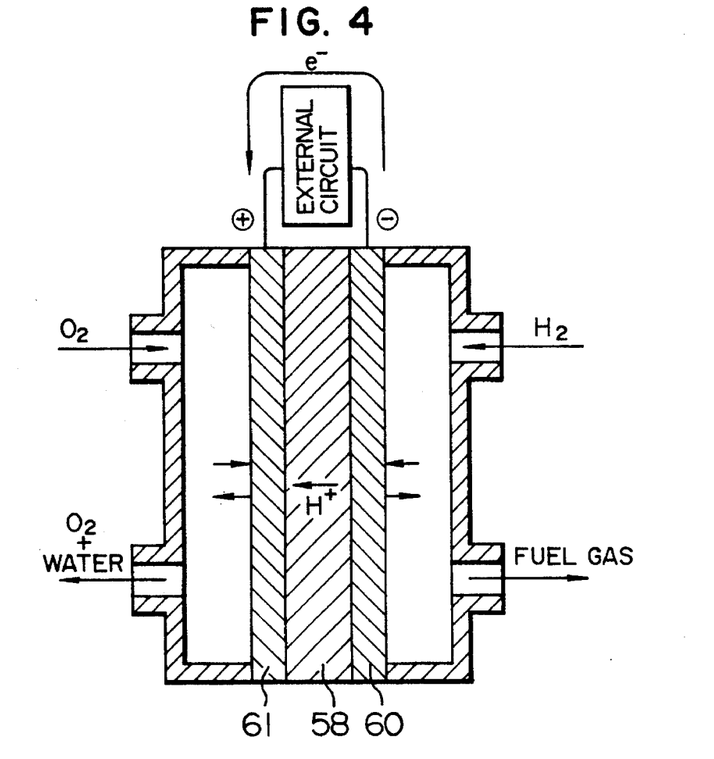
FIG. 4 is a diagrammatic sectional view of a unit cell of the solid polymer type fuel cell in the example of the present invention.

A unit cell of the fuel cell as shown in FIG. 4 was produced using cells A, B, C, D, E, F, A' and X of the above Examples and the Comparative Example.

In FIG. 4, 58 indicates a solid polymer electrolyte membrane. In the above Example and Comparative Example, "Nafion 117 membrane" manufactured by DuPont de Nemours, E. I., Co. was used as the solid polymer electrolyte membrane 58. In FIG. 4, 60 and 61 (both corresponding to the electrode 50 in FIG. 2) indicate an anode and a cathode, respectively. The amount of the solid polymer electrolyte added was 1.0 mg/cm² in terms of the weight per apparent electrode area for both the electrodes, but the same characteristics were obtained with addition of the electrolyte in the range of 0.1–3.0 mg/cm². The amount of platinum was 0.5 mg/cm² similarly in terms of the weight per the electrode area. Discharge test was conducted by feeding hydrogen gas moisturized at 90° C. was fed to the anode side and oxygen gas moisturized at 80° C. to the cathode side from the inlet of the cell toward the outlet of the cell, respectively.

Figure 5:
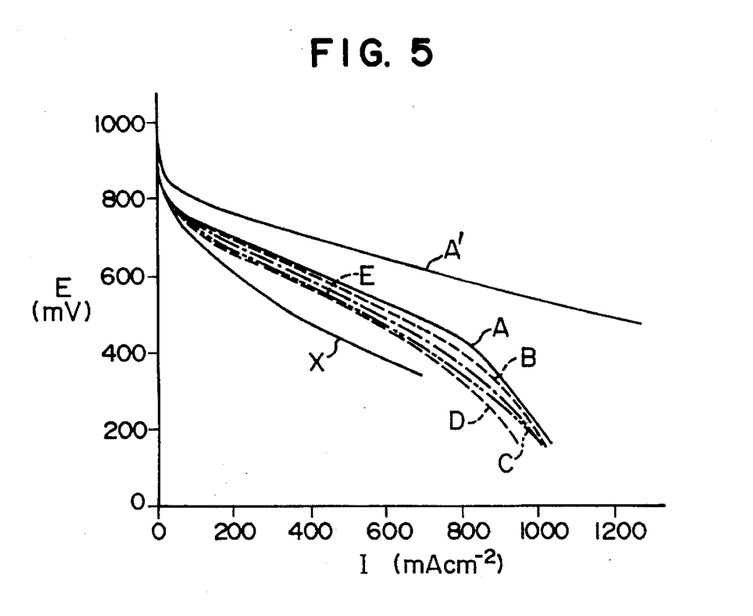
FIG. 5 is a graph which shows voltage (V)-current (I) characteristics.

FIG. 5 shows voltage-current characteristics of the fuel cells made by the method of representative examples using the organic solvents having effective carbon chain in the polar groups of Examples 1–5 and 7 and by the method of the comparative example. The fuel cells A, B, C, D, E and A' of the examples of the present invention showed cell voltages of 0.70 V, 0.69 V, 0.68 V, 0.67 V, 0.67 V and 0.77 V at a current density of 200 mA/cm², respectively.

On the other hand, the fuel cell X of the comparative example according to the conventional method showed a cell voltage of 0.62 V at a current density of 200 mA/cm².

From the results of the polarization test on the cells, it can be seen that the cells of the present invention made using the organic solvents having effective carbon chains in the polar groups of Examples 1–5 and 7 all show the higher characteristics than the conventional cell X.

Figure 7:
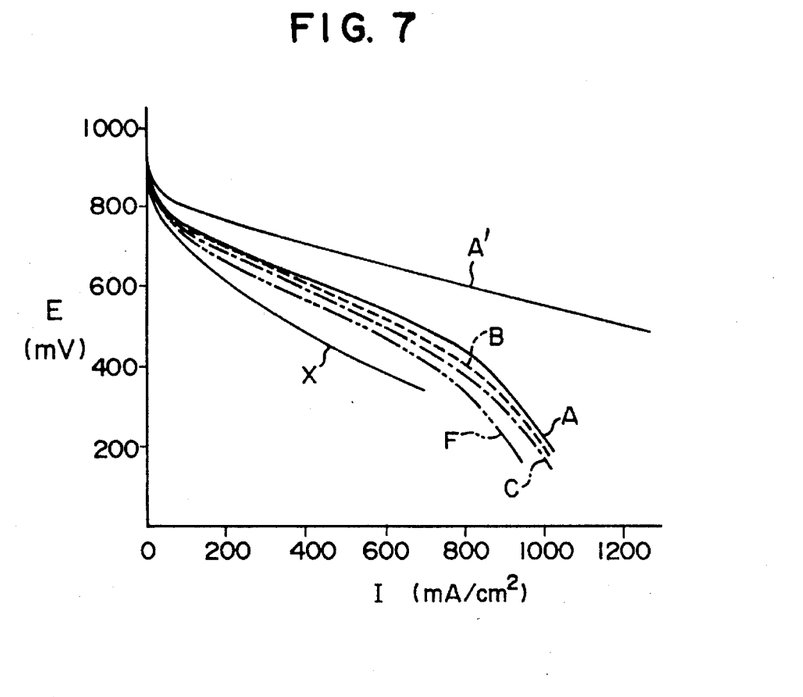
FIG. 7 is a graph which shows voltage (V)-current (I) characteristics of the fuel cell depending on the influence by the dielectric constant.

FIG. 7 shows voltage-current characteristics of the fuel cells made by the method of the representative examples using the organic solvents having a dielectric constant of 3–10 of Examples 6 and 7 of the present invention and by the method of the Comparative Example. The organic solvents of the cells other than the cell F correspond to the same organic solvents of Examples 1–3 and 7 and these cells showed the same test results. The fuel cells A, B, C, F and A' of the examples of the present invention showed cell voltages of 0.70 V, 0.69 V, 0.68 V, 0.67 V and 0.77 V at a current density of 200 mA/cm², respectively. On the other hand, the fuel cell X of the Comparative Example according to the conventional method showed a cell voltage of 0.62 V at a current density of 200 mA/cm².

From the results of the polarization test on the cells, it can be seen that the cells of the present invention made using the organic solvents having a dielectric constant of 3–10 of Examples 6 and 7 all show the higher characteristics than the conventional cell X. Furthermore, it can be recognized that the organic solvents having a dielectric constant of 5–8 are especially high in the effect and butyl acetate is the most suitable from safety and economical viewpoints.

From the results of the polarization test on the cells, it can be seen that the cells of the present invention made using the organic solvents having effective carbon chains in the polar groups of Examples 1–5 and 7 all show the higher characteristics than the conventional cells.

As explained above, by constructing a fuel cell using the electrode made by the method of the present invention, it has become possible to realize a solid polymer electrolyte fuel cell which shows the higher discharge performance.

Furthermore, as for the cell A', since carbon powders subjected to water repelling treatment with a fluoropolymer were added to the catalyst layer, the reaction gas feeding performance was improved and the cell voltage increased.

Figure 8:
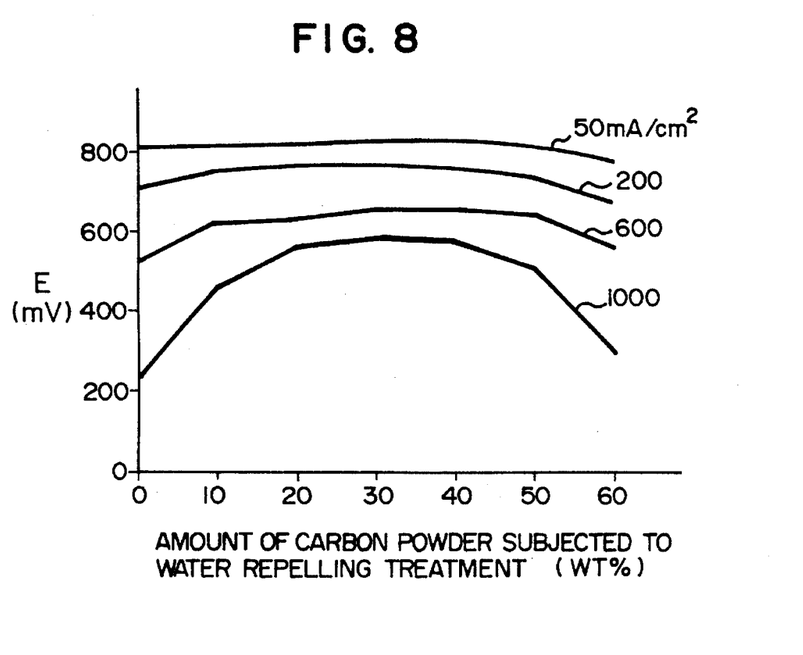
FIG. 8 is a graph which shows the relationship between the voltage of the fuel cell and the amount of the carbon powders subjected to water repellent treatment.

FIG. 8 shows relationship between the amount of the carbon powders subjected to the water repelling treatment with PTFE and the voltage at current densities of 50, 200, 600 and 1000 mA/cm$^2$ of the fuel cells of Examples 1 and 7. The voltage at 50 mA/cm$^2$ which may be the region controlled by a charge-transfer process somewhat decreased when the amount of the carbon powders subjected to water repelling treatment was 50% by weight or more, but the output was hardly affected. At 200 mA/cm$^2$, the voltage became constant in the case of up to 50% by weight in the amount of the carbon powders subjected to the water repelling treatment and when the amount was 60% by weight, the voltage decreased. At 600 and 1000 mA/cm$^2$, the voltage increased with increase in the amount of the carbon powders subjected to the water repelling treatment, but the cell voltage conspicuously decreased when the amount was 60% by weight.

TABLE 1

| Amount of carbon powders subjected to water repelling treatment (wt %) | 0 | 10 | 20 | 30 | 40 | 50 | 60 |
|---|---|---|---|---|---|---|---|
| Thickness of catalyst layer ($\mu$) | 8 | 22 | 25 | 32 | 45 | 51 | 65 |

Table 1 shows thickness of the catalyst layer at the respective amounts of the carbon fine powders subjected to water repelling treatment. It can be seen that thickness of the catalyst layer increases with increase in the amount of the carbon powders subjected to the water repelling treatment.

As is clear from FIG. 8, substantially no decrease in voltage in the low current density area was seen and thus, it became possible to inhibit decrease of coating of the platinum catalyst with PTFE, namely, decrease of the reaction area by the addition of carbon powders subjected to the water repelling treatment. Furthermore, it can be said that thickness of the electrode increases by the addition of the water repelled carbon powders, but the ability of gas feeding to the reaction site is improved due to the formation of gas channels and the voltage in the high current density area of 1000 mA/cm$^2$ or higher increases. However, it is considered that when amount of the water repelled carbon powders is 60% by weight or more, the effect obtained by the formation of gas channels is negated owing to the increase in the coating of platinum catalyst with PTFE and in the electrode thickness and as a result, the characteristics of the cell deteriorate.

The carbon powders subjected to the water repelling treatment with addition of a fluoropolymer exhibit the effect when they are added in an amount of 10–50% by weight based on the carbon weight of the noble metal catalyst-supporting carbon powders.

As a typical example of the organic solvents of ester, n-butyl acetate was used, but any of those which have an ester group in the molecule and have a carbon chain of 1–7 carbon atoms may be used and the similar effects can be obtained by using one or more of propyl formate, butyl formate, isobutyl formate, ethyl acetate, propyl acetate, isopropyl acetate, allyl acetate, isobutyl acetate, pentyl acetate, isopentyl acetate, methyl propionate, ethyl propionate, propyl propionate, methyl acrylate, butyl acrylate, isobutyl acrylate, methyl butyrate, methyl isobutyrate, ethyl butyrate, ethyl isobutyrate, methyl methacrylate, propyl butyrate, isopropyl isobutyrate, 2-ethoxyethylethyl acetate, 2-(2-ethoxyethoxy)ethyl acetate, etc.

As a typical example of the organic solvents of ethers, tetrahydrofuran was used, but any of those which have an ether group in the molecule and have a carbon chain of 3–5 carbon atoms may be used and the similar effects can be obtained by using one or more of dipropyl ether, dibutyl ether, ethylene glycol dimethyl ether, ethylene glycol diethyl ether, tripropylene glycol monomethyl ether, tetrahydropyran, etc.

As a typical example of the organic solvents of ketones, methyl amyl ketone was used, but any of those which have a ketone group in the molecule and have a carbon chain of 4–8 carbon atoms may be used and the similar effects can be obtained by using one or more of methyl butyl ketone, methyl isobutyl ketone, methyl hexyl ketone, dipropyl ketone, etc.

As a typical example of the organic solvents of amines, n-butylamine was used, but any of those which have an amino group in the molecule and have a carbon chain of 1–5 carbon atoms may be used and the similar effects can be obtained by using one or more of isopropylamine, isobutylamine, tert-butylamine, isopentylamine, diethylamine, etc.

As a typical example of the organic solvents of carboxylic acids, n-butyric acid was used, but any of those which have a carboxyl group in the molecule and have a carbon chain of 1–6 carbon atoms may be used and the similar effects can be obtained by using one or more of acetic acid, propionic acid, valeric acid, caproic acid, heptanoic acid, etc.

The organic solvents are added desirably in such an amount as capable of producing the finer colloidal dispersion, but the amounts employed in the above Examples are merely the representative values and never limit the present invention thereto.

Furthermore, in the above Examples, "5% Nafion solution" manufactured by Aldrich Chemical Co., Inc. was used as a representative example of copolymers of tetrafluoroethylene and perfluorovinyl ether as the solid polymer electrolyte, but this is not limitative and any solid polymer electrolytes can be used as far as they have a proton exchanging group, and the similar effects can be obtained by using the polymers differing in molecular structure. For example, there may be used polymers comprising perfluorovinyl ethers, polymers differing in side chain molecular length or copolymers of styrene and vinylbenzene.

Moreover, in the above Examples, a hydrogen-oxygen fuel cell was adopted, but the present invention can also be applied to fuel cells which use modified hydrogen obtained from methanol, natural gases, naphtha, etc. as fuels, those which use air as an oxidizing agent, and liquid fuel cells which directly use methanol as a fuel.

In addition, the assembly of the solid polymer electrolyte and the electrode of the present invention can be effectively applied to generators or purifiers of gases such as oxygen, ozone and hydrogen and various gas sensors such as oxygen sensors and alcohol sensors.

As explained above, according to the present invention, contact between the solid polymer electrolyte and the catalyst and dispersing state of them inside the electrode are improved and the three channels of the gas channel formed by the voids between the carbon powders which is a channel for feeding the fuel gas such as hydrogen or the oxidant gas such as oxygen, the proton channel formed by the hydrous solid polymer electrolyte and the electron channel formed by mutual connection of the carbon powders are formed in very close to each other inside the same catalyst layer and the reaction area increases.

Thus, feed of hydrogen and oxygen gas and transfer of proton and electron are carried out smoothly and in a wide range and thus it becomes possible to realize a solid polymer type fuel cell exhibiting the higher discharge performance and an assembly of a solid polymer electrolyte membrane and an electrode.

Furthermore, a solid polymer type fuel cell excellent in discharge characteristics in a high current density area without excessive coating of catalyst particles by adding carbon powders subjected to the water repelling treatment with a fluoropolymer.

What is claimed is:

1. A method for manufacturing a solid polymer type fuel cell which comprises producing an electrode by coating on one side of a gas-diffusible layer a noble metal catalyst-containing dispersion, said catalyst-containing dispersion being prepared by mixing carbon powder supporting said noble metal catalyst with a colloidal dispersion produced by mixing an organic solvent having a polar group, other than hydroxyl group and having a carbon chain of 1–8 carbon atoms which bonds to the polar group, with an alcoholic solution of a solid polymer electrolyte, and pressing the thus produced electrode onto at least one side of a solid polymer electrolyte membrane to integrate them.

2. A method according to claim 1, further comprising mixing the colloidal dispersion with a carbon powder subjected to a water repelling treatment with a fluoropolymer.

3. A method according to claim 2, wherein the carbon powder subjected to the water repelling treatment is added in an amount of 10–50% by weight based on the noble metal catalyst-supporting carbon powder and contains the fluoropolymer for the water repelling treatment in an amount of 25–70% by weight based on the total weight.

4. A method according to claim 1, wherein the organic solvent comprises one or more solvents having an ester group in the molecule and a carbon chain of 1–7 carbon atoms.

5. A method according to claim 1, wherein the organic solvent comprises one or more solvents having an ether group in the molecule and a carbon chain of 3–5 carbon atoms.

6. A method according to claim 1, wherein the organic solvent comprises one or more solvents having a carbonyl group in the molecule and a carbon chain of 4–8 carbon atoms.

7. A method according to claim 1, wherein the organic solvent comprises one or more solvents having an amino group in the molecule and a carbon chain of 1–5 carbon atoms.

8. A method according to claim 1, wherein the organic solvent comprises one or more solvents having a carboxyl group in the molecule and a carbon chain of 1–6 carbon atoms.

9. A method according to claim 2, wherein the organic solvent comprises one or more solvents having an ester group in the molecule and a carbon chain of 1–7 carbon atoms.

10. A method according to claim 2, wherein the organic solvent comprises one or more solvents having an ether group in the molecule and a carbon chain of 3–5 carbon atoms.

11. A method according to claim 2, wherein the organic solvent comprises one or more solvents having a carbonyl group in the molecule and a carbon chain of 4–8 carbon atoms.

12. A method according to claim 2, wherein the organic solvent comprises one or more solvents having an amino group in the molecule and a carbon chain of 1–5 carbon atoms.

13. A method according to claim 2, wherein the organic solvent comprises one or more solvents having a carboxyl group in the molecule and a carbon chain of 1–6 carbon atoms.

14. A method according to claim 1, wherein the organic solvent comprises one or more solvents selected from the group consisting of n-butyl acetate, propyl formate, butyl formate, isobutyl formate, ethyl acetate, propyl acetate, isopropyl acetate, allyl acetate, isobutyl acetate, pentyl acetate, isopentyl acetate, methyl propionate, ethyl propionate, propyl propionate, methyl acrylate, butyl acrylate, isobutyl acrylate, methyl butyrate, methyl isobutyrate, ethyl butyrate, ethyl isobutyrate, methyl methacrylate, propyl butyrate, isopropyl isobutyrate, 2-ethoxyethylethyl acetate, 2-(2-ethoxyethoxy)ethyl acetate, tetrahydrofuran, dipropyl ether, dibutyl ether, ethylene glycol dimethyl ether, ethylene glycol diethyl ether, tripropylene glycol monomethyl ether, tetrahydropyran, methyl amyl ketone, methyl butyl ketone, methyl isobutyl ketone, methyl hexyl ketone, dipropyl ketone, n-butylamine, isopropylamine, isobutylamine, tert-butylamine, isopentylamine, diethylamine, n-butyric acid, acetic acid, propionic acid, valeric acid, caproic acid, and heptanoic acid.

15. A method according to claim 14, wherein the organic solvent comprises one or more solvents selected from n-butyl acetate, tetrahydrofuran, methyl amyl ketone, n-butylamine, n-butyric acid and propionic acid.

16. A method for manufacturing a solid polymer type fuel cell which comprises producing an electrode by coating on one side of a gas-diffusible layer a noble catalyst-containing dispersion, said catalyst-containing dispersion being prepared by mixing a carbon powder supporting said noble metal catalyst with a colloidal dispersion produced by mixing one or more organic solvents, having a dielectric constant of 3–10, with an alcoholic solution of a solid polymer electrolyte, and pressing the thus produced electrode onto at least one side of a solid polymer electrolyte membrane to integrate them.

17. A method according to claim 16, further comprising mixing the colloidal dispersion with a carbon powder subjected to a water repelling treatment with a fluoropolymer.

18. A method according to claim 17, wherein the carbon powder subjected to the water repelling treatment is added in an amount of 10–50% by weight based on the noble metal catalyst-supporting carbon powder and contains the fluoropolymer for the water repelling treatment in an amount of 25–70% by weight based on the total weight.

19. A solid polymer electrolyte membrane and electrode assembly, wherein the electrode is produced by a method comprising: coating on one side of a gas-diffusable layer a noble catalyst-containing dispersion, said catalyst-containing dispersion being prepared by mixing a carbon powder supporting said noble metal catalyst with a colloidal dispersion produced by mixing one or more organic solvents, having a dielectric constant of 3–10, with an alcoholic solution of a solid polymer electrolyte, pressing the thus produced electrode onto at least one side of a solid polymer electrolyte membrane.

20. A solid polymer electrolyte membrane and electrode assembly according to claim 19, wherein the electrode comprises a cathode or an anode.

21. A solid polymer type fuel cell comprising a solid polymer electrolyte membrane, and electrodes provided on both sides of the membrane; at least one of said electrodes comprising a gas-diffusible layer and a layer being formed by coating on one side of said gas diffusible layer a dispersion containing a noble metal catalyst prepared by mixing carbon powder to which said noble metal catalyst has been supported with a colloidal dispersion produced by mixing an organic solvent, having a polar group other than hydroxyl group and having a carbon chain of 1 to 8 carbon atoms which bonds to the polar group, with an alcoholic solution of a solid polymer electrolyte, and pressing the thus produced electrode onto said one side of said gas diffusible layer.

* * * * *